United States Patent Office 3,117,159
Patented Jan. 7, 1964

3,117,159
DERIVATIVES OF THE TETRACYCLINE-TYPE
ANTIBIOTICS
Hans H. Rennhard, Lyme, Lloyd H. Conover, Quaker
Hill, Philip N. Gordon, Old Lyme, and Charles R.
Stephens, Jr., Niantic, Conn., assignors to Chas.
Pfizer & Co., Inc., New York, N.Y., a corporation of
Delaware
No Drawing. Filed June 14, 1960, Ser. No. 35,870
5 Claims. (Cl. 260—559)

This invention is concerned with a process for the preparation of certain novel organic compounds and with the new compounds thus prepared. In particular, it is concerned with the preparation of certain derivatives of tetracycline-type antibiotics and the acid addition salts thereof.

The term "tetracycline-type antibiotics" is taken to include tetracycline, 5-hydroxytetracycline, 7-chlortetracycline, 7-bromotetracycline, all of which possess a highly substituted perhydronaphthacene ring system, and certain derivatives of these compounds, such as, 6-demethyltetracycline, 6-deoxytetracycline, 4-epitetracycline, 6-deoxy-6-demethyltetracycline, 6-demethyl-7-chlortetracycline, and 5-hydroxy-6-deoxytetracycline. Also included are the acid addition salts thereof with mineral acids, such as, hydrochloric, sulfuric and phosphoric acids, and with strong organic acids, such as paratoluenesulfonic acid.

In the literature certain 4-desdimethylaminotetracyclines have been described being prepared by the reaction of a tetracycline with zinc and acetic acid. Exemplary of these compounds is 4-desdimethylamino-12a-deoxy-7-chlortetracycline prepared from chlortetracycline.

The new compounds of the present invention are 6,12a-dideoxytetracyclines which may be represented by the following formula although other enolic tautomers are possible:

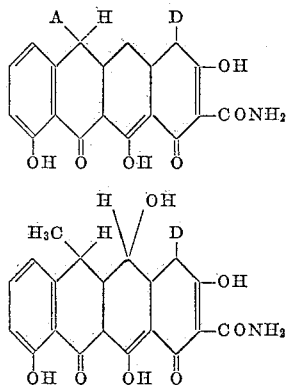

and the pharmaceutically acceptable acid addition salts thereof and metal chelate salts wherein: A is selected from the group consisting of hydrogen and methyl and D is selected from the group consisting of hydrogen and $N(CH_3)_2$.

These novel substances have molecular formulas which differ from those of the parent 6-deoxytetracyclines from which they are derived by one oxygen atom; said oxygen atom being removed from the 12a-position to give 6,12a-dideoxytetracycline antibiotics. From a structural standpoint, replacement of the 12a-hydroxyl group by hydrogen is accomplished by a change in the direction of enolization in the B ring of the tetracycline-type antibiotics.

The compounds of this invention have unique pharmaceutical and physiological properties which distinguish them from the parent antibiotics and related derivatives thereof. Their antibiotic spectra differ from those of the parent compounds.

The 6,12a-dideoxy compounds possess activity against a variety of gram-positive and gram-negative microorganisms and, in addition, are particularly effective against tetracycline-resistant strains of bacteria. By virtue of this lack of cross-resistance they represent a significant contribution to the pharmaceutical industry and the public welfare. They appear to be rapidly and completely absorbed from the gastrointestinal tract. The present substances in the pure free base form are very insoluble in water and in most of the comomn organic solvents which particularly adapts them for use in the preparation of pharmaceutical suspensions, topical preparations, such as dusting powders and ointments, and for repository parenteral forms for intramuscular use. They provide aqueous suspensions which have improved stability and a bland taste, and, since they possess activity similar to the parent tetracycline compounds, are used in dosage forms and compositions of similar concentration. They appear to be far more resistant to epimerization than are the parent antibiotics from which they are derived.

The present new compounds may be generally prepared by catalytic hydrogenation, in a substantially anhydrous reaction-inert solvent, of a 12a-(O-acyl) derivative of the desired tetracycline-type antibiotic wherein the acyl radical is that of a hydrocarbon carboxylic acid containing from one to six carbon atoms inclusive or of the 12a-(O-arylcarbamyl) derivative of the appropriate tetracycline-type antibiotic wherein the arylcarbamyl radical is selected from the group consisting of:

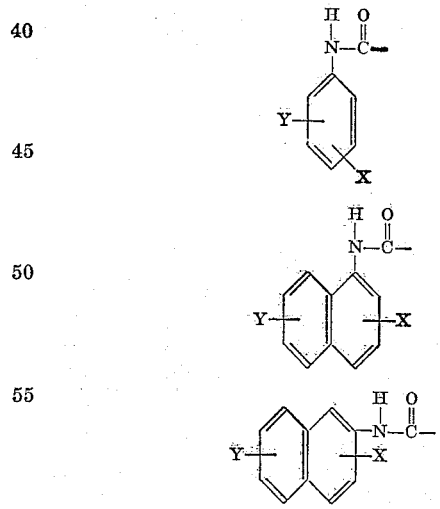

wherein X and Y are selected from the group consisting of hydrogen, halogen, nitro, amino, lower alkyl and lower alkoxy. Suitable 12a-(O-acylated)-tetracycline-type antibiotics which may serve as starting materials for the process of this invention to produce the novel 12a-deoxy compounds within the purview of this invention are listed below:

12a-(O-monoformyl)-6-deoxy-4-desdimethylaminotetracycline
12a-(O-monoformyl)-6-deoxytetracycline
12a-(O-monoformyl)-6-deoxy-6-demethyltetracycline
12a-(O-monoformyl)-6-deoxy-7-chlortetracycline
12a-(O-monoacetyl)-5-hydroxy-6-deoxytetracycline
12a-(O-monopropionyl)-5-hydroxy-6-deoxytetracycline
12a-(O-monobutyryl)-6-deoxytetracycline
12a-(O-mono-n-caproyl)-6-deoxytetracycline 12a-(O-arylcarbamyl) derivatives suitable as reactants in the process of this invention are:

12a-(O-phenylcarbamyl)-6-deoxytetracyline
12a-(O-phenylcarbamyl)-6-demethyl-6-deoxytetracycline
12a-(O-phenylcarbamyl)-4-desdimethylamino-6-deoxytetracycline
12a-(O-phenylcarbamyl)-5-hydroxy-6-deoxytetracycline
12a-(O-2,5-dichlorophenylcarbamyl)-6-deoxytetracycline
12a-(O-p-methoxyphenylcarbamyl)-6-deoxytetracycline
12a-(O-p-iodophenylcarbamyl)-6-deoxy-5-hydroxytetracycline
12a-(O-o-xylylcarbamyl)-6-demethyl-6-deoxy-7-chlortetracycline
12a-(O-p-butylphenylcrabamyl)-6-deoxytetracycline
12a-(O-2,4-dichlorophenylcarbamyl)-6-deoxytetracycline
12a-(O-2-nitro-4-tolylcarbamyl)-6-deoxytetracycline
12a-(O-o-chlorophenylcarbamyl)-6-deoxytetracycline
12a-(O-o-methoxyphenylcarbamyl)-6-deoxytetracycline
12a-(O-p-bromophenylcarbamyl)-6-deoxytetracycline
12a-(O-p-ethoxyphenylcarbamyl)-6-deoxytetracycline
12a-(O-p-nitrophenylcarbamyl)-6-deoxytetracycline
12a-(O-naphthylcarbamyl)-6-deoxytetracycline
12a-(O-2-naphthylcarbamyl)-5-hydroxy-6-deoxytetracycline
12a-(O-2-methyl-1-naphthylcarbamyl) 5-hydroxy-6-deoxytetracycline
12a-(O-1-naphthylcarbamyl)-6-deoxy-7-chlortetracycline
12a-(O-2,5-dichloro-1-naphthylcarbamyl)-6-deoxytetracycline
12a-(O-p-nitrophenylcarbamyl)-6-deoxy-6-demethyl-4-desdimethylaminotetracycline
12a-(O-p-nitrophenylcarbamyl)-6-deoxy-4-desdimethylamino-5-hydroxytetracycline
12a-(O-phenylcarbamyl)-4-desdimethylamino-6-deoxy-6-demethyltetracycline
12a-(O-p-fluorophenylcarbamyl)-6-deoxytetracycline The 12a-(O-monoformyl) derivatives utilized as reactants in the present process are prepared from the tetracycline-type antibiotics by treatment with from 1 to 25 molecular proportions of acetoformic acid at a temperature of from −30° C. to +50° C. as described in the copending patent application filed on December 23, 1958, by Stephens and Blackwood, Serial No. 782,407, now abandoned. The phenylcarbamyl derivatives utilized as reactants are prepared from the tetracycline-type antibiotics by reaction with the appropriate aryl isocyanate under anhydrous conditions in an inert solvent as described in the copending patent application of Blackwood, Serial No. 813,653, filed May 18, 1959, now Patent No. 2,976,318, issued March 21, 1961. The 12a-(O-monoesters) other than the 12a-(O-monoformyl) derivatives are prepared as described by Gordon, U.S. 2,812,349, November 5, 1957.

Suitably a tetracycline-type antibiotic having acyl groups in other positions of the molecule in addition to the 12a-position can also be used in the process of this invention. Thus, 10,12a-(O-diacyl)-5-hydroxy-6-deoxytetracycline, 5,12a - (O - diacyl) - 5 - hydroxy - 6 - deoxytetracycline, 12,12a - (O - diacyl) - 6 - deoxy - 4 - epitetracycline, 12,12a-(O-diacyl)-6-deoxytetracycline and diformyl-5-hydroxy-6-deoxytetracycline undergo hydrogenolysis with removal of the 12a-acyloxy group to produce the corresponding 12a-deoxy derivative of the acylated tetracycline-type antibiotics. Hydrogenolysis of a polyacylate derivative, wherein for example, the 6 and 12a-hydroxy groups are acylated, by the process of this invention results in simultaneous replacement of both ester groups by hydrogen with formation of a dideoxy derivative. The remaining acyl groups can be removed by hydrolysis with, for example, an alkaline reacting material such as ammonium hydroxide, sodium carbonate, sodium hydroxide or the corresponding potassium salts. Acid hydrolyzing agents are also operative. Of the many hydrolyzing agents available, ammonium hydroxide is preferred since it permits the use of mild reaction conditions and avoids side reactions.

The 10,12a-(O-diacyl)-derivatives are obtained as described in copending patent application Serial No. 813,652, filed May 18, 1959, now Patent No. 3,047,617, issued July 31, 1962. The 12,12a-(O-diacyl), the 5,12a-(O-diacyl) derivatives utilized as starting materials are prepared according to the procedure of Gordon described in copending application filed on July 2, 1957, Serial Number 669,442, now abandoned.

The 12a-(O-monoformyl and 12a-(O-arylcarbamyl) derivatives undergo hydrogenolysis under mild conditions of temperature and pressure; that is, at temperatures from about 45° C. to 100° C. and pressures from about atmospheric to about 150 p.s.i. The remaining 12a-(O-acyl)-derivatives require conditions of higher pressures to effect reduction.

The presence of an acyl group at the C-10 hydroxy group, in addition to the C-12a-hydroxy group, appears to activate hydrogenolysis to the 12a-deoxy compound whereas an acyl group in certain other positions appears to retard reaction. Thus, the 10,12a-(O-diacetyl) derivative of 5-hydroxy-6-deoxytetracycline undergoes hydrogenolysis with conversion to the 6,12a-dideoxy derivative of 10-(O-monoacetyl)-5-hydroxytetracycline under mild conditions of temperature and pressure. The 5, 12a-(O-diacetyl) derivative of 5-hydroxy-6-deoxytetracycline, on the other hand, requires relatively high pressures and elevated temperatures in order to effect removal of the 12a-acyloxy group.

12a-(O-acyl) and arylcarbamyl derivatives of 7-bromo-6-deoxytetracyclines and 7-chlor-6-deoxytetracyclines, when subjected to the process of the present invention undergo a two step hydrogenolysis to produce 6,12a-dideoxytetracyclines.

In carrying out the process of the present invention, the 12a-(O-monoformyl) or 12a-(O-arylcarbamyl) derivative of a 6-deoxytetracycline-type antibiotic, is dissolved in a suitable substantially anhydrous reaction-inert solvent and hydrogenated in the presence of a suitable hydrogenation catalyst. As suitable solvents there may be mentioned dioxane, tetrahydrofuran, ethyl acetate, dimethylformamide, pyridine, phenetole, dialkyl ethers, cellosolve acetate, and other aprotic solvents. Tetrahydrofuran, ether and dioxane represent preferred solvent systems. Solvents which contain hydroxyl groups, such as alcohols, are detrimental to the process of this invention since they may cause hydrolysis of the 12a-formyl group. However, with other 12a-acyl or arylcarbamyl derivatives, alcohols are operative as solvents. Solvents such as, aldehydes and ketones, which are unstable to hydrogenation are to be avoided. The solvent used need not be completely anhydrous. Traces of water, such as are found in the commercially available grades of solvents suitable for the process do not interfere with the reaction.

The choice of hydrogenation catalyst is not critical. The noble-metal hydrogenation catalysts, such as, palladinized-charcoal, platinum black, and platinum oxide can be used. Palladinized charcoal is the preferred catalyst in view of its availability, the relatively mild reaction conditions which it requires, and the overall yields realized.

In general, from about 1% to about 10% of palladium, based upon the weight of 6-deoxytetracycline-type, antibiotic present, is used in the form of palladinized charcoal (5%). Smaller or larger quantities of catalyst can be employed; however, the range cited above is satisfactory from the standpoint of yields and economics.

The temperature, pressure and time of the reaction are inter-related to the extent that a high temperature permits utilization of a relatively low pressure and relatively short reaction times; whereas a low temperature requires a relatively high pressure and generally relatively longer reaction periods.

In general, a temperature of from about 45° C. to about 100° C. can be used. Lower and higher temperatures are operable but not desirable because of poor yields resulting from insufficient reaction or decomposition.

A pressure of from about atmospheric to about 2000 p.s.i. can be used over the temperature range given above. Lower and higher pressures are operable but, because of low yields of desired products, or the need for specialized apparatus, are not desirable.

A reaction period of from about ¼ hour to about 25 hours, depending upon the temperature and pressure chosen, is generally adequate to produce maximum yields.

In general, it is preferred to use the 12a-(O-monoformyl)-, 12a-(O-arylcarbamyl), and 10,12a-(O-diacyl)-derivatives of the 6-deoxytetracycline-type antibiotics as reactants for preparing the 6,12a-dideoxy compounds of this invention because of the relatively mild reduction conditions required. The reaction is advantageously conducted in tetrahydrofuran using from about 1% to 5% palladium on charcoal (5%) by weight of tetracycline-type antibiotic as hydrogenation catalyst at a temperature of from about 45° C. to 85° C. and a hydrogen pressure of from about 40 p.s.i. to 100 p.s.i. for a period of about 8 hours to 20 hours. At the end of the reaction period, the hydrogen pressure is released, the vessel flushed with nitrogen and the contents removed. The catalyst is removed by filtration and washed with solvent. An equal volume of methanol is added to the combined filtrate and washings and the mixture concentrated under reduced pressure. The product is removed by filtration, washed with methanol and dried in vacuo at about 75° C.

When using the 5,12a-(O-diacetyl)-, the 12a-(O-monoacetyl) and the diformyl derivatives of 5 hydroxytetracycline as starting materials, pressures up to 2000 p.s.i. and temperatures up to 100° C. may be required to bring about hydrogenolysis. Side reactions may occur in some cases. The products thus obtained which still contain an acyl group can be hydrolyzed directly to the 6,-12a-dideoxy-non-acylated derivatives and then isolated in the manner described. Alternatively, the 12a-deoxy-acyl derivative can be separated as such by evaporation of the solvent or by precipitation with, for example, a non-solvent, such as, hexane, and then subjected to hydrolysis whereby the remaining acyl group is removed.

The present new 6,12a-dideoxytetracyclines differ from corresponding 12a-deoxytetracyclines in that they are not intermediates for making 5a,6-anhydro-12a-deoxytetracyclines. The former further differ from the latter in their effectiveness against various microorganisms as described herein.

6,12a-dideoxy-6-demethyltetracycline demonstrates bioactivity against *Klebsiella pneumoniae* and other organisms as hereinafter described. It may be bioassayed by the standard turbidimetric procedure using *K. pneumoniae* as the test organism.

As indicated above, the products of the present invention possess appreciable biological activity against a variety of pathogenic organisms. The following table lists the antibacterial activity of 6,12a-dideoxytetracycline in comparison with 12a-deoxytetracycline as determined by the standard serial dilution technique. Minimum inhibitory concentrations (MIC) in terms of mcg./ml. are recorded.

TABLE I

| Organism | MIC | |
|---|---|---|
| | 6,12a-dideoxy-6-demethyl-tetracycline | 12a-deoxy tetracycline |
| *Micrococcus pyogenes* var. *aureus* | 3.12 | 3 |
| *Streptococcus pyogenes* | 6.3 | 3 |
| *Streptococcus faecalis* | 6.3 | 3 |
| *Diplococcus pneumoniae* | 3.12 | 6.3 |
| *Corynebacterium diphtheriae* | 1.56 | 12.5 |
| *Erysipelothrix rhusiopathiae* | 0.39 | 3 |
| *Listeria monocytogenes* | 0.39 | 12.5 |
| *Bacillus subtilis* | 0.78 | 3 |
| *Lactobacillus casei* | 0.78 | 100 |
| *Bacterium ammoniagenes* | 6.3 | 6.3 |
| *Aerobacter aerogenes* | 6.8 | 12.5 |
| *Escherichia coli* | 6.8 | 12.5 |
| *Proteus vulgaris* | 25 | 100 |
| *Pseudomonas aeruginosa* | 12.5 | 100 |
| *Salmonella typhosa* | 12.5 | 12.5 |
| *Salmonella pullorum* | 12.5 | 6.3 |
| *Klebsiella pneumoniae* | 12.5 | 25 |
| *Neisseria gonorrhoeae* | 12.5 | 6.3 |
| *Hemophilus influenzae* | 12.5 | 3 |
| *Shigella sonnei* | 12.5 | 12.5 |
| *Erwinia amylovora* | 100 | 25 |
| *Phytomonas tumefaciens* | 6.3 | 0.78 |
| *Brucella bronchiseptica* | 1.56 | 6.3 |
| *Malleomyces mallei* | 12.5 | 25 |
| *Desulfovibrio desulfuricans* | | 12.5 |
| *Vibrio comma* | 0.78 | 1.56 |
| *Pasteurella multocida* | 0.78 | 3 |
| *Mycobacterium 607* | 6.3 | 1.56 |
| *Mycobacterium berolinense* | 6.3 | 0.39 |
| *Candida albicans* | >100 | >100 |
| *Pityrosporum ovale* Traub | | >100 |
| *Pityrosporum ovale* 12078 | | >100 |
| Antibiotic resistant strains of *Micrococcus pyogenes* var. *aureus*. | | |
| 376 [1] | 6.3 | 100 |
| 400 [1] | 6.3 | 50 |

[1] These organisms are known to be resistant to tetracycline.

Of the present new compounds, the 4-desdimethylamino-6,12a-dideoxy compounds are especially valuable as intermediates, e.g. the corresponding 6-deoxy and 6-deoxy-6-demethyl compounds, because of their improved acid stability over corresponding known tetracyclines. This improved acid stability makes them more suitable for use as intermediates in the synthesis of tetracyclines, particularly in reactions where acids are employed, such as halogenation in strongly acid medium e.g. bromination in sulfuric, hydrobromic, or trifluoroacetic acid. Of particular value is 4-desdimethylamino-6,12a-dideoxy - 6 - demethyl-tetracycline and the corresponding 7-chloro or 7-bromo compounds, which may be synthesized from simple organic compounds or prepared according to the present procedure.

6,12-dideoxytetracyclines undergo reaction with a variety of reagents often in a unique and unexpected manner. Treatment of 6,12a-dideoxytetracycline with bromine in buffered solution produces a product having an ultraviolet spectrum identified as that of 4a,12a-anhydrotetracycline. Formaldehyde or trichloromethylfluoride yields a product which exhibits an 8-hydroxytetralone type absorption in the ultraviolet. The present new 6,12a-dideoxytetracyclines serve as intermediates for the production of 4a,-12a-anhydro-4-desdimethylamino-6 - deoxytetracyclines as described in copending application Serial Number 5,336, filed January 29, 1960, now Patent No. 3,043,876, issued July 10, 1962.

Furthermore, the 6,12a-dideoxy compounds of this invention can be reacted with formaldehyde and various primary and secondary amines, including aliphatic, aromatic and heterocyclic amines, to form Mannich type reaction products, or with various aldehydes and ketones to form biologically active adducts in which carbonyl compound and antibiotic exist in a 1:1 molar ratio. The new compounds thus produced exhibit solubility characteristics which differ from those of the parent compounds. In addition, 6,12a-dideoxytetracyclines may serve as a basis for the synthesis of tetracycline and for the introduction of a halogen atom into the 12a-position.

This application is a continuation-in-part of copending application Serial Number 813,654, filed May 18, 1959, now Patent No. 3,002,021, issued Sept. 26, 1961.

The following examples are given by way of illustration and are not to be regarded as limitations of this invention, many variations of which are possible without departing from the spirit or the scope thereof.

Example I

6-DEMETHYL-6,12a-DIDEOXYTETRACYCLINE

*Method I.*—A mixture of 3.0 g. of 12a-(O-formyl)-6-deoxy-6-demethyltetracycline, 1.25 g. of 5% palladium-on-carbon in 75 ml. of tetrahydrofuran were placed in a reaction vessel of the Parr hydrogenator. The reaction vessel was flushed with hydrogen, pressurized to 40 p.s.i. and agitated at 52° C. for 12 hours. After cooling the reaction mixture was filtered, the filtrate washed with tetrahydrofuran. The catalyst cake was reslurried in methanol, and filtered with methanol wash and the combined methanol solutions evaporated to yield 0.85 g. of crude 12a-deoxy product. The crude product, 200 mg., is dissolved in 7 ml. of acetone containing 0.5 ml. of 5% hydrochloric acid. The crude base dissolves and the pure hydrochloride crystallizes. The collection of the crystalline material and drying yield 100 mg. of product.

*Method II.*—A mixture of 1 g. of 12a-(O-formyl)-6-deoxy-6-demethyltetracycline, and 0.5 g. of 5% palladium-on-carbon in 5 ml. of dimethylformamide was hydrogenated at 1 atmosphere of hydrogen gas for 7 hours. The reaction mixture was filtered and the filtrate washed with dimethylformamide. The combined mother liquor and wash were treated dropwise with an equal volume of water to obtain a pure 12a-deoxy product which is recovered by filtration, 70 mg. of product are obtained in this manner. Elemental analysis of the product gave the following results.

Calcd. for $C_{21}H_{22}N_2O_6$: C, 63.3; H, 5.6; N, 7.0. Found: C, 62.7; H, 5.6; N, 6.9.

Ultraviolet absorption in methanolic HCl, the solution having been allowed to stand overnight to achieve tautomeric equilibrium shows λ max. at 266, 323, 427 and 439 mμ. The crystalline product melts at 274° C. (dec.).

Example II

The procedure of Example I is repeated using 0.5 g. of palladium black as catalyst with comparable results.

Similarly the same results are obtained when platinum oxide or platinum black are used at atmospheric pressure and 100° C.

Example III

Following the procedure of the preceding example, the O-12a-acyl derivatives of the tetracycline-type antibiotics listed below are converted to the corresponding 12a-deoxy derivatives.

| Reactant | Product |
|---|---|
| 12a-O-monoformyl)-6-deoxy-6-demethyl-7-chlortetracycline. | 6-demethyl-6,12a-dideoxytetracycline. |
| 12a-(O-monoformyl)-6-deoxytetracycline. | 6,12a-dideoxytetracycline. |
| 12a-(O-phenylcarbamyl)-6-deoxy-6-demethyltetracycline. | 6-demethyl-6,12a-dideoxytetracycline. |
| 12a-(O-phenylcarbamyl)-5-hydroxy-6-deoxytetracycline. | 5-hydroxy-6,12a-dideoxytetracycline. |
| 12a-(O-phenylcarbamyl)-6-deoxytetracycline. | 6,12a-dideoxytetracycline. |
| 12a-(O-phenylcarbamyl)-4-desdimethylamino-5-hydroxy-6-deoxytetracycline. | 4-desdimethylamino-5-hydroxy-6,12a-dideoxytetracycline. |
| 12a-(O-phenylcarbamyl)-7-bromo-6-deoxytetracycline. | 6,12a-dideoxytetracycline. |
| 12a-(O-phenylcarbamyl)-4-desdimethylamino-7-chloro-6-deoxytetracycline. | 4-desdimethylamino-6,12a-dideoxytetracycline. |
| 12a-(O-phenylcarbamyl)-4-desdimethylamino-6-demethyl-6-deoxytetracycline. | 4-desdimethylamino-6-demethyl-6,12a-dideoxytetracycline. |
| 12a-(O-phenylcarbamyl)-4-desdimethylamino-6-deoxytetracycline. | 4-desdimethylamino-6,12a-dideoxytetracycline. |

Example VI

6-DEMETHYL-6,12a-DIDEOXYTETRACYCLINE HYDROCHLORIDE 1.0 g. of 6-demethyl-6,12a-dideoxytetracycline is dissolved in methanol containing an equimolar amount of hydrogen chloride. The salt is precipitated with ether and recrystallized from ethylacetate-methanol as yellow crystals.

In like manner, the hydrochloride salts of the 6,12a-dideoxy products of the preceding examples are prepared, in the cases in which an amino group is present at the 4-position.

Substitution of sulfuric acid or phosphoric acid for hydrochloric acid produces the corresponding sulfates and phosphates salts.

Example VII

METAL CHELATE SALTS OF 6-DEMETHYL-6,12a-DIDEOXYTETRACYCLINE

The metal salt complexes of the 6-demethyl-6,12a-dideoxytetracyclines are prepared by dissolving them in a lower aliphatic alcohol, preferably methanol, and treating with an equivalent amount of the appropriate metal salt preferably dissolved in methanol. The complexes are isolated in some instances by simple filtration, but often, since many of the metal salt complexes are alcohol soluble, by evaporation of the solvent or addition of a nonsolvent such as diethyl ether.

In this fashion, metal salt complexes of the 6,12a-dideoxytetracyclines described in the previous examples are prepared employing the following metal salts: calcium chloride, cobalt chloride, magnesium sulfate, magnesium chloride, ferric chloride, zinc chloride, cupric chloride, cadmium chloride, barium chloride, silver nitrate, stannous nitrate, magnesium acetate, manganous chloride and cerium chloride. A number of these salts such as the calcium and magnesium complexes are useful for therapeutic purposes. Those salts not suitable for therapeutic purposes are useful in the purification and isolation of the 12a-deoxy compounds and also in the preparation of the therapeutically useful complexes.

What is claimed is:

1. A compound selected from the group consisting of compounds of the formulae

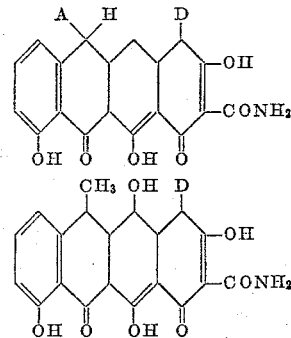

wherein
  A is selected from the group consisting of hydrogen and methyl; and D is selected from the group consisting of hydrogen and $N(CH_3)_2$; the alkali metal salts thereof and the mineral acid addition salts of those compounds wherein D is $N(CH_3)_2$.

2. 6,12a-dideoxytetracycline
3. 6,12a-dideoxy-6-demethyltetracycline
4. 6,12a-dideoxy-6-demethyl-4-desdimethylaminotetracycline
5. 6,12a-dideoxy-5-hydroxytetracycline

UNITED STATES PATENTS

References Cited in the file of this patent 2,922,817     Green _____ Jan. 26, 1960

(Other references on following page)

FOREIGN PATENTS

| | | |
|---|---|---|
| 3,651 of 1958 | Africa | Apr. 29, 1959 |
| 572,382 | Belgium | Apr. 25, 1959 |

OTHER REFERENCES

Australian abstract, 42,534/58, open to public inspection, April 23, 1959.

Belgium Recueil des Brevets d'Invention, pages 1931–1932, July-December (1958), effective date Oct. 31, 1958.

Stephens: "Journal American Chemical Society," vol. 76, pages 3568–3575 (1954).

Stephens et al.: "Journal American Chemical Society," vol. 80, pages 5324–25 (1958).

Stephens et al.: Journal American Society, vol. 74, pages 4976–4977 (1952).